United States Patent [19]

Krude et al.

[11] Patent Number: 4,478,592
[45] Date of Patent: Oct. 23, 1984

[54] UNIVERSAL JOINT SEALING ASSEMBLY

[75] Inventors: Werner Krude, Siegburg-Kaldauen; Karl-Heinz Müller, Wissen, both of Fed. Rep. of Germany

[73] Assignee: Uni-Cardan Aktiengesellschaft, Siegburg, Fed. Rep. of Germany

[21] Appl. No.: 421,862

[22] Filed: Sep. 23, 1982

[30] Foreign Application Priority Data

Oct. 13, 1981 [DE] Fed. Rep. of Germany ....... 3140542

[51] Int. Cl.³ .............................................. F16D 3/84
[52] U.S. Cl. .................................. 464/173; 464/175
[58] Field of Search ................ 464/170, 172, 173, 175

[56] References Cited

U.S. PATENT DOCUMENTS 2,547,734 4/1951 Barager ............................. 464/170
3,798,927 3/1974 Girguis .......................... 464/175 X Primary Examiner—John Petrakes
Attorney, Agent, or Firm—Toren, McGeady and Stanger

[57] ABSTRACT

A universal joint assembly having a universal joint which includes a pair of joint yokes and a cross member with an input and an output shaft being connected, respectively, to each of the joint yokes is formed to include a sealing boot of resilient material which is connected at its ends to both the input and the output shafts on opposite sides of the universal joint to completely cover the joint. The sealing boot is particularly constructed to include internal formations intermediate the ends thereof which engage with the joint yokes of the universal joint to provide additional fixing support connecting the sealing boot in sealing engagement over the universal joint.

5 Claims, 4 Drawing Figures

UNIVERSAL JOINT SEALING ASSEMBLY

The present invention relates generally to universal joint assemblies and more particularly to the construction of a sealing boot for such an assembly.

Generally, a universal joint is formed to include two joint yokes with a cross member received in bores of the joint yokes and connecting the yokes together. An input and an output shaft may be connected, respectively, to each of the yokes and usually the cross member connecting the yokes is supported in bearing bushes or bearing members and roller or friction members mounting the cross member in bores of the yokes.

Generally, universal joints will include a resilient sealing boot to seal the joint parts from dust and deleterious material.

The present invention is particularly concerned with a sealing boot which is adapted to bridge the entire space between the input and output shafts connected with the yokes of the joint so that the boot will be subjected to the entire relative movement which occurs between the shaft members.

In the prior art, an assembly of the type to which the present invention relates is disclosed in U.S. Pat. No. 2,547,734. In this device, the sealing boot consists of two individual boot members which are secured to the input and output shafts with the larger diameter ends being held on a reinforcing ring. The universal joint is tightly sealed but a distribution of load on the boot during articulation of the joint is not assured. The disadvantage of a design of this type is that the reinforcing ring is not guided and there are no folds in the boot so that the boot may be applied only in cases where the angle of articulation is small.

Accordingly, the present invention is directed toward provision of a universal joint assembly which will operate to reduce the load on the sealing boot especially in the case of universal joints which operate predominantly in the vicinity of the maximum angle of articulation. The invention is thus intended to prolong the life of the boot and to avoid risking the operational safety of the sealing boot as a result of parts rubbing against each other.

SUMMARY OF THE INVENTION

Briefly, the present invention may be described as a universal joint assembly comprising a universal joint including a pair of joint yokes and a cross member interconnecting the joint yokes, an input and an output shaft connected, respectively, through each of said joint yokes, and a sealing boot formed of resilient material connected at its ends to both said input and output shafts on opposite sides of said universal joint and extending to completely cover said joint, said sealing boot comprising internal formations intermediate the ends thereof engaging said joint yokes to provide additional fixing means supporting said sealing boot in sealing engagement over said universal joint.

In accordance with the invention, the objectives of the invention are achieved in that between the fixing points attaching the sealing boot at opposite ends of the joint assembly to the input and output shafts there is provided the additional fixing means which connect the intermediate portions of the boot on the outer faces of the joint yokes in the area of the bores in the yokes within which the cross member is supported. The advantage of such a design is that by providing intermediate securing means for the sealing boot on the joint yokes, the entire boot or parts of the boot will be prevented from coming into contact with joint parts during operation of the joint and from being damaged as a consequence thereof, which damage would eventually lead to failure of the joint since the lubrication system of the joint, especially when oil is used as a lubricant, would immediately collapse.

In accordance with a further embodiment of the invention, from a technical production point of view, it is found particularly favorable to provide the intermediate internal formations of the sealing boot in the form of projections corresponding to the diameters of the bores in the yoke members within which the cross member is supported so that the projections will engage in the bores of the joint yokes.

The advantage of such a structure is that the runout of the joint yoke bores which is no longer in contact with the cross member may at the same time be used as part of the fixing means for additionally securing the sealing boot. Advantageously, the projections or plugs extending from the intermediate portion of the boot may be formed with a round configuration adapted to the diameter of the bores so that they may be pressed or pushed into the bore runout to ensure accurate affixation of the sealing boot.

In a case where the bores in the joint yokes have a runout which is not sufficiently deep to ensure secure engagement of the sealing boot internal formations, provision may be made for additional fixing means in the form of webs which extend across the outer contour of the joint yoke to be held by a pretension of the sealing assembly. The advantage of such a design is that the webs corresponding to the outer contour of the joint yoke may be formed into the sealing boot with the webs being suitably arranged so that they may be pushed across the entire joint yoke. Accordingly, a suitable tension will be formed which will ensure that the boot will be held on the four arms of the joint yokes.

In accordance with a further important feature of the invention, the sealing boot is formed with additional folds so that axial movement thereof will be accommodated when there occurs a change in the length or spacing between the input and the output shafts. In a case of a universal joint wherein either the input or the output shaft may be adapted for telescopic length adjustment, for example by means of a sliding spline connection, suitable design of the boot with additional folds will ensure that the boot will adapt to the telescopic length adjustments while maintaining an appropriate sealing of the assembly. As a result, the boot may then be used to seal both the joint and the spline assembly with a common supply of lubricant.

The various features of novelty which characterize the invention are pointed out with particularity in the claims annexed to and forming a part of this disclosure. For a better understanding of the invention, its operating advantages and specific objects attained by its use, reference is made to the accompanying drawings and descriptive matter in which there are illustrated and described preferred embodiments of the invention.

DETAILED DESCRIPTION OF THE PREFERRED EMBODIMENTS

Figure 1:
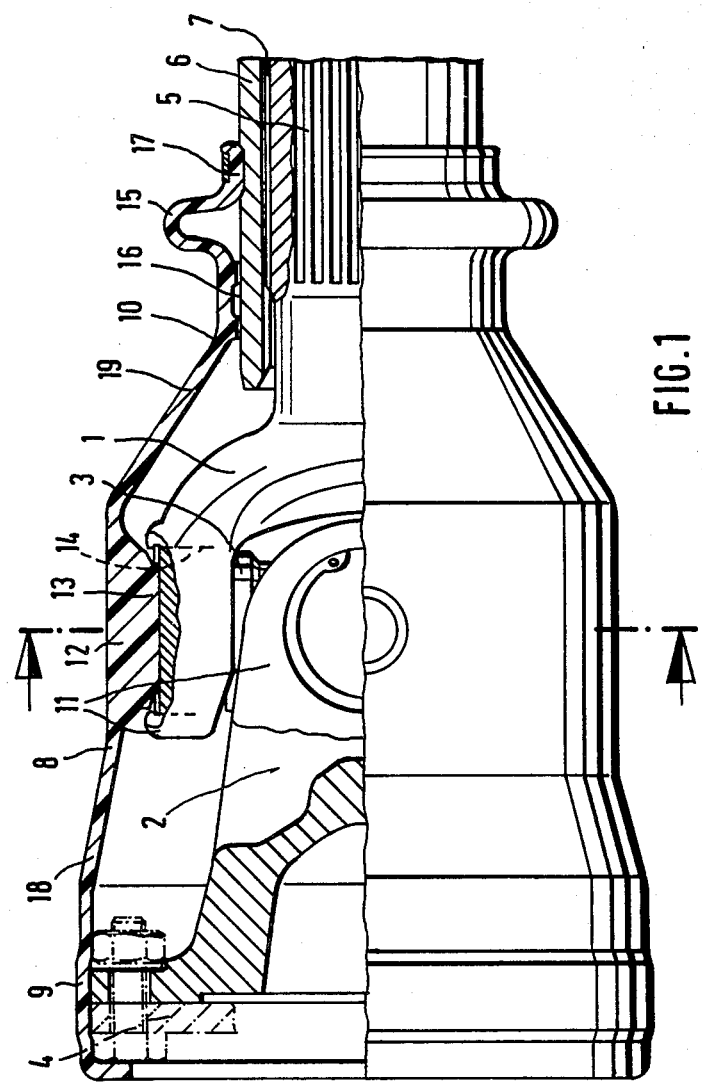
FIG. 1 is a sectional view showing a first embodiment of universal joint assembly in accordance with the invention.

Referring now to the drawings and particularly to FIG. 1, there is shown a first embodiment of a universal joint assembly in accordance with the present invention which comprises a joint yoke 1 and a joint yoke 2 connected with each other by a cross member 3. The end of the joint yoke 2 is secured to a shaft flange 4 which may be attached to a machine element, a shaft, or the like. The joint yoke 1 is connected to a shaft 5 which, by means of splines 7, is axially movable but nonrotatably connected with a hollow shaft 6.

The sealing boot in accordance with the invention extends across the entire universal joint and is formed with a first fixing point 9 which attaches the boot 8 to the first shaft member in the form of the flange 4. The opposite end of the boot 8 is connected with the shaft 6 at a fixing point 17.

The joint yokes 1 and 2 are provided with outer faces 11 upon which there is engaged additional fixing means 12. The additional fixing means 12 are formed to comprise projection 13 which are adapted to engage into bores 14 formed in the joint yokes 1 and 2. The joint yokes 1 and 2 are constructed with a total of four bores and, thus, the additional fixing means 12 are provided with four projections 13, each of which are adapted to engage in one of the bores 14. Accordingly, a total of four projections 13 are provided distributed across the circumference engaging in two bores 14 formed in each of the joint yokes 1 and 2.

As will be seen from FIG. 1, the entire universal joint is sealed by the sealing boot 8 which is made of a flexible elastic material such as a suitable rubber. The boot extends between the first attachment portion 9 extending over the flange 4 and the second attachment portion 17 secured to the tubular shaft 6. The four inwardly extending internal projections 13 are provided on an intermediate portion of the sealing boot forming the additional fixing means 12.

The bores 14 formed in the yokes 1 and 2 are adapted to receive bearing cups or bushes whereby the cross member 3 of the joint is supported in the yokes. Since the cross member may not occupy the entire length of the bores 14, a runout portion of the bores 14 exists wherein the projections 13 of the intermediate or additional fixing means 12 of the boot may be engaged so as to join the boot in supporting engagement with the yokes 1 and 2.

Adjacent the attachment portion 17, the sealing boot 8 is formed with a fold 15 and a guiding formation 10. The guiding formation 10 is adapted to slide along the external surface 16 of the shaft 6 in order to accommodate relative axial movement of the splines 7. Thus, relative axial sliding movement between the shaft 5 and the hollow shaft 6 will be accommodated by the fold 15 by sliding movement of the guiding formation 10 along the sliding surface 16 of the shaft 6. The fixing point 17 maintains the boot 8 in firm engagement with the shaft 6 and the arrangement is such that axial movement may be accommodated while ensuring angular displacement or articulation of the joint which is accommodated by intermediate parts 18 and 19 of the sealing boot 8.

Figure 2:
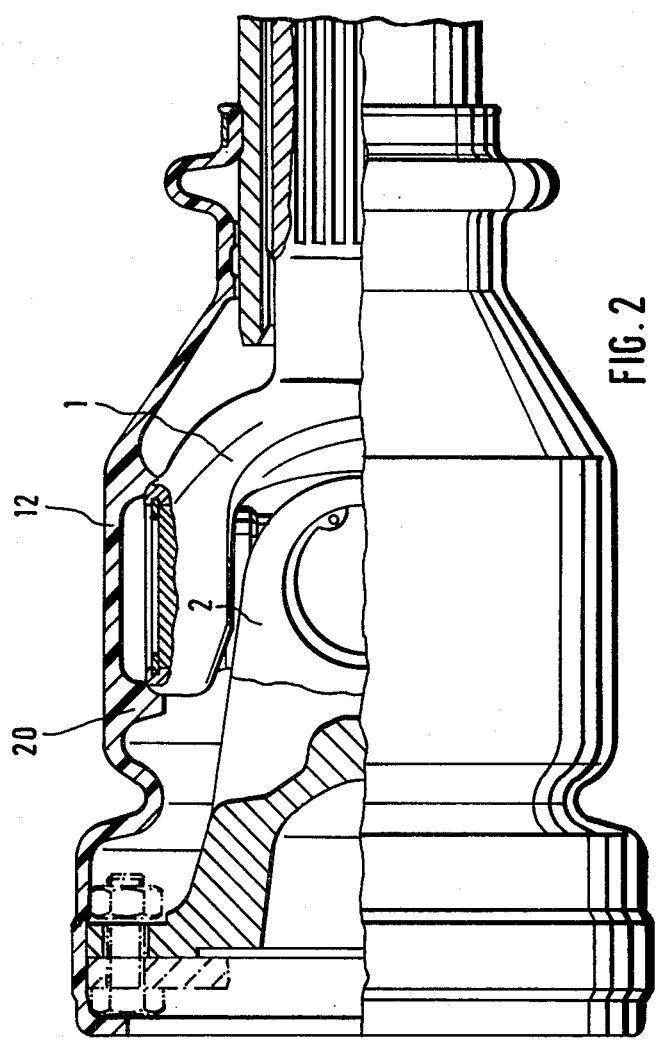
FIG. 2, is a sectional view showing a second embodiment of the invention.

FIG. 2 shows a second embodiment of the invention. In FIG. 2, an assembly is provided wherein the boot is formed with webs 20 instead of the projections 13, with the webs 20 extending across the exterior of the arms of the yokes 1 and 2. The webs are arranged so that they may be pushed across the joint yokes when the boot is being fitted and they are held under tension in the material of the web.

Figure 3:
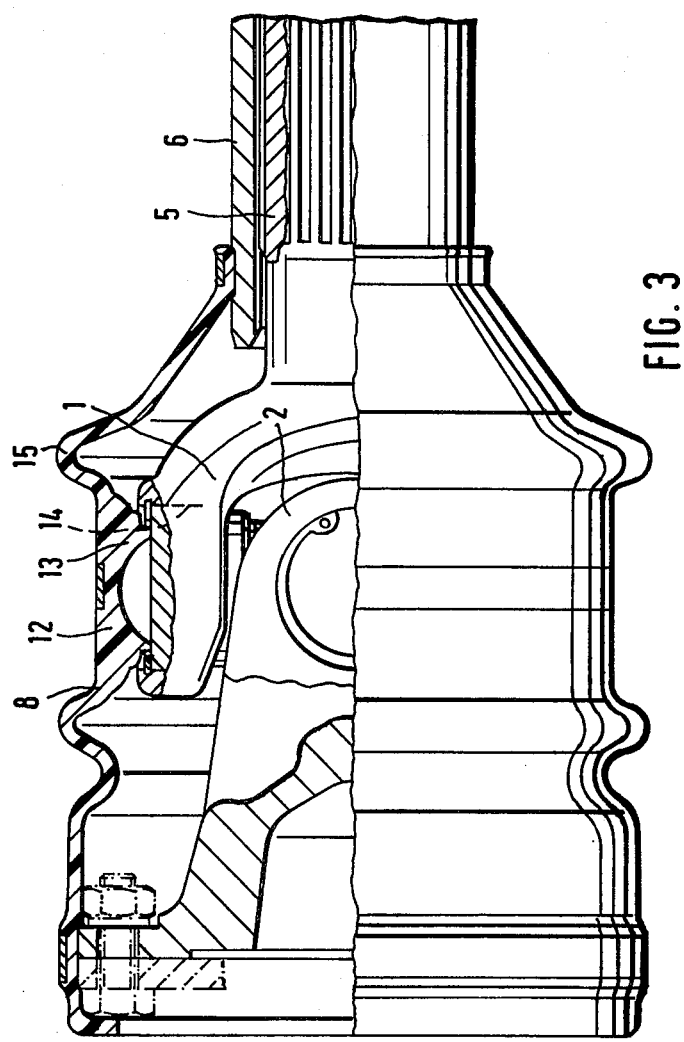
FIG. 3 is a sectional view showing a third embodiment of the invention.

Another embodiment of the invention is depicted in FIG. 3 which shows a sealing boot which is, in principle, similar to the boot of FIG. 1, the difference being that the fold 15 is located adjacent the intermediate portion 12 of the boot. The boot is formed with internal projections 13 which extend into the ends of the bores in the joint yokes and an additional tensioning band is provided around the external circumference of the boot in this region in order to ensure that the projections do not become displaced from the bores in the joint yokes.

Figure 4:
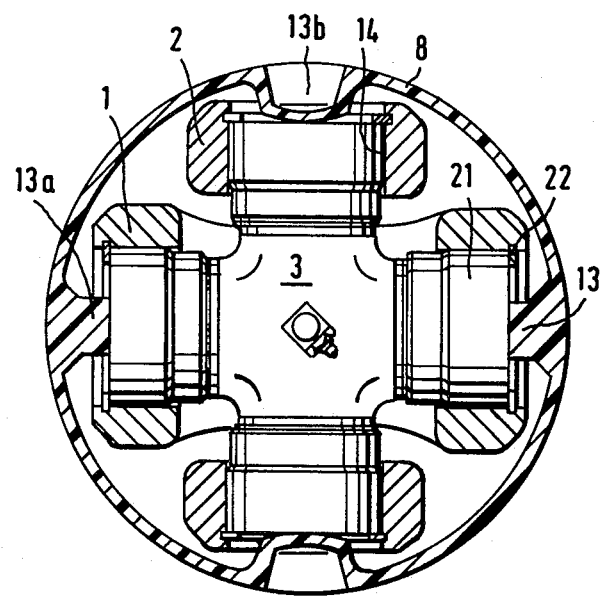
FIG. 4 is a cross-section of a universal joint assembly in accordance with the invention.

A transverse cross-section of the universal joint assembly of the invention is shown in FIG. 4, which depicts the assembly of the joint yokes 1 and 2 and the cross member 3 with bearing cups 21 held in bores 14 in the yoke arms and retained by circle clips 22. Two alternative forms of the projections 13 are provided and, as seen in FIG. 4, the projections may comprise a projection 13*a* and/or a projection 13*b* extending inwardly from the boot 8 and contacting the end faces of the bearing cups 21 as illustrated.

Thus, the sealing boot 8 of the invention will be seen to be capable of extending across the entire circumference of the universal joint and also to extend across the length thereof from an input shaft to an output shaft. The cross member 3 is held in bores 14 of the joint yokes 1 and 2 by means of bearing bushes 21 and in addition rolling or friction bearings may be provided between the journals of the cross member 3 and the bushes 21. The cross member 3 and the bearing bushes 21 are axially secured together by the circle clips or rings 22 and the projections 13 of the additional fixing means 12 formed at the intermediate portions of the sealing boot will be supported on the end faces of the bearing bushes 21 while extending into the bores 14 of the joint yokes 1 and 2.

While specific embodiments of the invention have been shown and described in detail to illustrate the application of the inventive principles, it will be understood that the invention may be embodied otherwise without departing from such principles.

What is claimed is:

1. A universal joint assembly comprising:
   a universal joint including a pair of joint yokes and a cross member interconnecting said joint yokes;
   a first shaft member and a second shaft member connected, respectively, to each of said joint yokes; and
   a sealing boot formed of resilient material and having first and second opposite ends, with said first end connected to said first shaft member and with said second end connected to said second shaft member, said sealing boot extending continuously between said first and second ends thereof to completely cover said universal joint;
   said sealing boot comprising
   an annular securing portion intermediate said first and said second ends located to extend circumferentially about said joint yokes, and a plurality of internal formations uniformly spaced circumferentially apart about said joint yokes and extending inwardly from said annular securing portion, each of said formations engaging said joint yokes to provide additional fixing means supporting said sealing boot in sealing engagement over said universal joint.

2. An assembly according to claim 1 wherein said joint yokes are formed with bores within which said cross member is received in supporting engagement, said formations in said sealing boot comprising projections adapted to extend into the ends of said bores.

3. An assembly according to claim 2 wherein said projections are formed of substantially the same diameter as the diameter of said bores.

4. An assembly according to claim 1 wherein said sealing boot is formed with at least one fold for accommodating axial change in the distance between said first and second shaft members.

5. An assembly according to claim 1 wherein said internal formations comprise webs adapted to engage on the external surfaces of said joint yokes to support said sealing boot with a resilient tension on said joint yokes.

* * * * *